United States Patent [19]

Bunting

[11] 3,750,975
[45] Aug. 7, 1973

[54] CONTROL DEVICE FOR PROJECTOR FILM STRIPPING AND THREADING MECHANISM

[75] Inventor: Leslie J. Bunting, Rochester, N.Y.

[73] Assignee: Eastman Kodak Company, Rochester, N.Y.

[22] Filed: Apr. 23, 1971

[21] Appl. No.: 136,803

[52] U.S. Cl. .................................. 242/192, 242/187
[51] Int. Cl. .......................... G03b 1/58, B65h 25/28
[58] Field of Search ..................... 242/195, 192, 197, 242/205, 186, 187, 188; 352/72, 157, 158

[56] References Cited
UNITED STATES PATENTS 3,506,345  4/1970  Wells .......................... 242/197 UX
3,552,683  1/1971  Bundschuh et al. ................. 242/192

Primary Examiner—Louis R. Prince
Assistant Examiner—John M. Jillions
Attorney—W. H. J. Kline and Milton S. Sales

[57] ABSTRACT

A self-threading motion picture projector includes a control device which latches a film stripping and threading mechanism of the projector in its active position wherein it is effective to feed film from a roll of film supported by the projector. When the leading end of the film has entered a film gate of the projector and has been engaged by a film-advancing member (which advances the film at a rate faster than the film stripping and threading mechanism), the control device is unlatched in response to the resulting tension of the film between the gate and the supply reel, thereby causing the stripping and threading mechanism to return to its inactive position so that the film can be projected. In the event the mechanism is moved to its active position when there is less than a minimum length of film on the supply reel (i.e., the film roll is of less than a minimum diameter), or if there is no supply reel on the projector, the control device will not latch the film stripping and threading mechanism in its active position.

6 Claims, 4 Drawing Figures

PATENTED AUG 7 1973 3,750,975

LESLIE J. BUNTING
INVENTOR.

BY Milton J. Sales

W. H. J. Kline
ATTORNEYS

LESLIE J. BUNTING
INVENTOR.

CONTROL DEVICE FOR PROJECTOR FILM STRIPPING AND THREADING MECHANISM

BACKGROUND OF THE INVENTION

1. Field of the Invention

The present invention relates to self-threading motion picture projectors of the type disclosed in my commonly assigned U.S. Pat. No. 3,558,208, entitled "Control Device for Self-Threading Motion Picture Projector," the disclosure of such patent being incorporated into this disclosure. More particularly, the invention relates to the provision of such a projector with an improved control device which prevents the film stripping and threading mechanism (also known as the film feeding mechanism) from being retained in an active condition when there is less than a minimum length of film on the supply reel, or in the absence of a supply reel.

2. Description of the Prior Art

The film stripping and threading mechanism for motion picture projectors as disclosed in my above-identified patent includes a drive member which is movable to an active position at which a longitudinally movable endless belt is in peripheral engagement with a roll of film wound onto a supply reel in a film cartridge, thereby imparting unwinding rotation to that roll. A stripper finger is also moved into peripheral engagement with the film roll to separate the leading end of the film from the roll and to guide it along a predetermined threading path partially defined between the stripper finger and the belt member. By this means, the leading end of the film is caused to enter a film gate of the projector, where it is engaged by a pull-down claw or other equivalent film-advancing member which thereupon advances it intermittently through the film gate.

The drive member and stripper finger must be retained in engagement with the roll and, upon completeion of the film threading operation (i.e., upon engagement of the film by the film-advancing member), the drive member and the stripper finger must be moved out of peripheral engagement with the film roll before the film is displayed. In the projector disclosed in the aforementioned U.S. patent, this is accomplished by means of a latch mechanism which retains the drive member and the stripper finger in their respective active positions until the latch member is released in response to the resulting tensioning of the film between the gate and the film supply reel, thereby permitting the drive member and the stripper finger to move out of engagement with the film roll. Additionally, the latch member can be released manually at any time by means of the same operating member employed to initiate the film threading operation.

In self-threading cartridge-loaded motion picture projectors of this type, the film stripping and threading mechanism will not move into contact with the film roll to remove the leading end of the roll from the reel if the film is less than a minimum length. If the mechanism is moved to its active position when the supply roll is of less than a minimum diameter, or if there is not supply reel on the projector, film may not be threaded to the gate and in such cases there will be no film tension to release the latch member. While the latch member can be released manually, this may not be apparent and may cause confusion in cases where the operator is unfamiliar with the projector and has not carefully read the instruction manual. Should this occur when the film is carried in a cartridge, the operator may not notice that the stripper finger and belt member is within the cartridge. If the operator attempts to remove the cartridge at this time to find the cause of the problem, damage may result to the projector mechanism.

SUMMARY OF THE INVENTION

It is an object of the present invention to avoid latching of a film stripping and threading mechanism in the above-described type of projector in its active position if there is less than a minimum diameter film roll on the supply reel or in the absence of any supply reel on the projector.

In accordance with the above object, I have provided a simple and reliable control device adapted to be incorporated in the above-described type of projector wherein in response to manual movement of an operating member, the film stripping and threading mechanism is moved to its active position where it is releasably retained in engagement with the film roll by a latch member of a control device. Should the film threading operation be initiated when there is less than a minimum length of film on the supply roll or when there is no supply reel on the projector, the latch member will be ineffective to retain the film stripping and threading elements in their respective active positions.

The invention, and its objects and advantages, will become more apparent in the detailed description of the preferred embodiment presented below.

BRIEF DESCRIPTION OF THE DRAWINGS

In the detailed description of the preferred embodiment of the invention, presented below, reference is made to the accompanying drawings, in which.

DESCRIPTION OF THE PREFERRED EMBODIMENT

Figure 1:
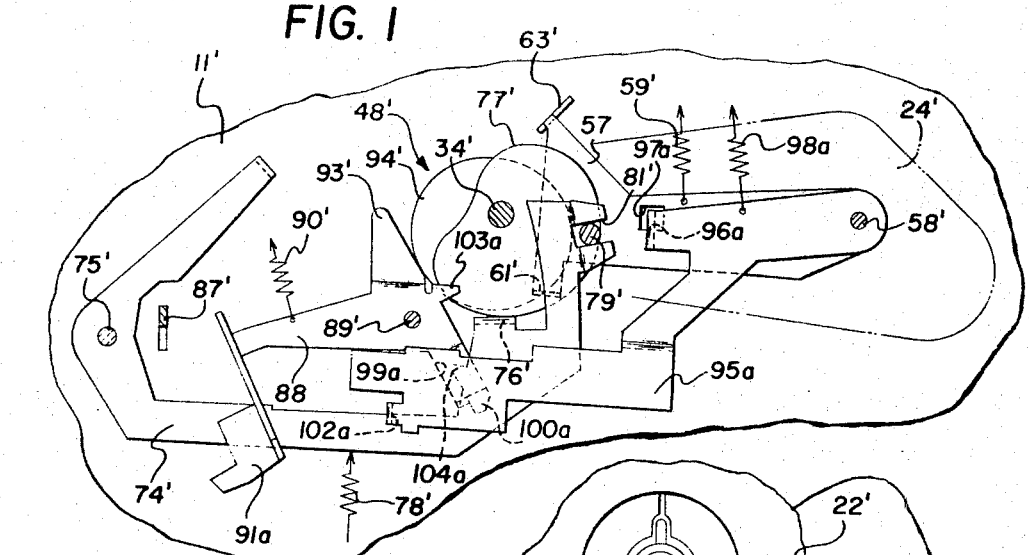
FIG. 1 is an elevational view of a portion of a self-threading motion picture projector taken from inside the projector to show the arrangement of internally located components of the film stripping and threading mechanism in association with a control device according to the present invention.

The projector partially illustrated in the accompanying drawings is basically the same as the one described more specifically in my above-identified U.S. Pat. No. 3,558,028, but omits various components of the previously disclosed machine which do not relate directly to understanding the present invention. It will be understood, however, that such components are completely compatible with the subject control device and have been deleted from the present disclosure only for the purposes of clarity. Some of the elements shown in the accompanying drawings are identical to corresponding elements in the patent, and these elements have been referred to by the same reference numerals as were used in the patent. These numerals have been identified in the present application by the placement of a prime mark adjacent thereto. Other elements shown in the accompanying drawings correspond generally to elements shown in the patent but have been modified to varying extents. These modified elements have been given the same reference numerals as were used in the patent but without a prime mark. Certain other features of the present invention do not have corresponding parts in the patent, and these elements have been referred to by reference numerals followed by the suffix a.

The illustrative projector comprises a frame plate 11' that may be disposed in a vertical plane. A roll of film 21' is shown wound onto a film supply reel 22', which is releasably supported for rotation on the projector by a rotatable spindle 23', for example.

When the film roll is initially mounted on the projector, the leading end of the film is separated from the film roll and fed along a guide path to a film gate where it will be engaged by a film pull-down claw, not shown, which thereafter drives the film into engagement with the hub of a film take-up reel, not shown. As previously mentioned, the feeding of film to the gate is performed by a film stripping and threading mechanism (sometimes referred to as a film feeding mechanism) comprising a drive member 24' having a longitudinally movable endless belt, not shown, and a stripper finger 25'. Both the drive member and the stripper finger are described in detail in U.S. Pat. No. 3,558,028.

Figure 2:
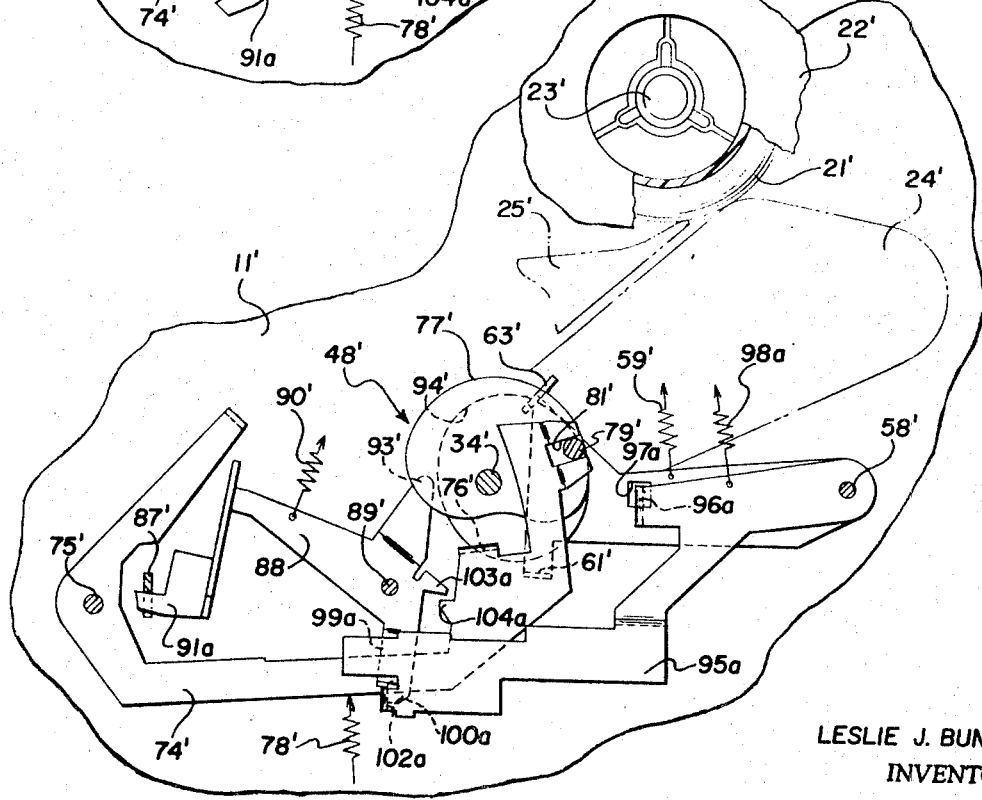
FIG. 2 is a view from the same viewpoint as FIG. 1, depicting the relative positions assumed by the various illustrated elements of the film stripping and threading mechanism and of the subject control device during the film stripping and threading phase of the operating cycle of the projector.

Drive member 24' pivots about a drive shaft 34' between its inactive position shown in FIG. 1 and an active position at which it is in engagement with the roll of film on reel 22' as shown in FIG. 2. When the drive member is moved to an active position, it imparts unwinding rotation to the film roll as described in the aforementioned patent. In operation, the film roll is rotated in an unwinding direction by the drive member, and the film roll is engaged by stripper finger 25' so that the leading end of the film enages the finger and is thereby separated from the roll and delivered along the guide path.

The mechanism employed to move the stripper member 25' and drive member 24' subsequently into engagement with the film roll comprises a three-lobed cam member 48' (two lobes being shown) rotatably supported on a drive shaft 34' between frame plate 11' and a carrier plate, not shown. A clutch-operating means includes a lever 57 pivotally mounted on the carrier plate by a pin 58' and biased upwardly (clockwise) by a spring 59'. A pair of ears 61' and 63' on lever 57 control a clutch member, not shown, in a manner fully described in U.S. Pat. No. 3,558,028 to selectively couple cam member 48' to drive shaft 34' to rotate the cam member between an initial position shown in FIG. 1 and an intermediate position shown in FIG. 2. Upon movement of lever 57 to its position shown in FIG. 2, cam member 48' is coupled to shaft 34' to rotate the cam member through an angle of approximately 120° whereupon the cam member is again immobilized at its intermediate position. Thereafter, movement of lever 57 back to its former position similarly causes the cam member to be driven through an angle of approximately 240° to restore it to its initial position.

The position of drive member 24' is controlled by cam member 48' through the agency of a control lever 74' which is pivoted to a support stud 75' and provided with a cam follower ear 76' biased toward engagement with a cam lob 77' by a spring 78'. A positioning stud 79', rigidly attached to drive member 24', is received in a slot 81' at the corresponding end of the control lever, thereby correlating the position of the drive member with that of the control lever.

Except during the film stripping and threading operation, lever 57 is angularly oriented as shown in FIG. 1, whereby the drive member and the stripper finger are retained in their respective inactive positions. Upon movement of lever 57 to its lower position shown in FIG. 2, cam lobe 77' presents a decreasingly smaller radius to cam follower ear 76' of control lever 74' so that spring 78' can pivot the slotted end of the control lever upwardly to thereby rotate the drive member into resilient driving engagement with the film roll. At such time stripper finger 25' is also moved into engagement with the film roll by means fully set forth in U.S. Pat. No. 3,558,028.

As explained in the aforementioned patent, during the projection of the film, a snubber member between the supply reel and the gate is free to pivot downwardly against the influence of a relatively weak leaf spring to absorb momentary fluctuations in the film tension. The trailing end of the film is attached to the film supply reel 22' so that the film is drawn taunt between the gate and that reel when all of the available film has been displayed. When this occurs, the snubber member is pivoted to its lowermost position so that it engages and depresses a trigger member 87' to initiate the rewinding of the film by effecting automatic adjustment of a rewind mechanism, not shown, which opens the film gate and imparts film rewinding rotation to the film supply reel. During the film stripping and threading operation, however, the snubber member must be retained in its raised position with greater force than that afforded by its spring in order to insure that the leading end of the filmstrip will be guided positively into the film gate. This is accomplished in the apparatus according to the present invention by means of a snubber arm 88 which is biased upwardly above a pivot pin 89' by a spring 90' to urge a shoe 91a toward engagement with trigger member 87'. A cam follower ear 93' on arm 88 is adapted to engage a lobe 94' on cam member 48', holding the arm in its inoperative position as shown in FIG. 1 whenever the cam member is in its initial position. As the cam member rotates to its FIG. 2 or intermediate position, as previously described, the decreased radius of the portion of cam lobe 94' adjacent cam follower ear 93' allows spring 90' to pivot arm 88 upwardly until shoe 91a contacts trigger member 87' so that the film snubber member must overcome the combined force of its own spring and spring 90' to depress trigger member 87'.

The position of lever 57 is established by an operating lever 95a which is pivotally mounted on the carrier plate by pin 58' and forms another part of the clutch-operating means. A tab 96a on operating lever 95a passes through an opening 97a in lever 57 so that by manually moving operating lever 95a downwardly against the force of a spring 98a, lever 57 is moved from its position shown in FIG. 1 to its position shown in FIG. 2 to initiate the film stripping and threading operation by initiating rotation of the cam member from its initial position to its intermediate position.

Snubber arm 88 carries a latching arm 99a with a bent tab 100a. Operating lever 95a also has a bent tab 102a. When the operator manually depresses operating lever 95a, lever 57 is pivoted downwardly, as previously explained, thereby initiating rotation of the cam member to its intermediate position. As soon as rotation proceeds, cam lobe 94' allows spring 90' to pivot snubber arm 88 to the position shown in FIG. 2, as also explained above, and in so doing moves latching arm 99a to the position illustrated in that same figure so that tab 100a engages tab 102a of the operating lever and the engagement between parts 95a and 99a and the force exerted by spring 90' hold operating lever 95a and lever 57 latched in their lower position in opposition to springs 59' and 98a. Thus, as soon as such engagement of tabs 100a and 102a has been established, the operator can release operating lever 95a without interrupting the continuing performance of the film stripping and threading operation.

When the completion of the film stripping and threading operation has brought the leading end of the film into contact with the pull-down claw, the longitudinal movement imparted to the film by the claw exceeds the rate in which the film can be unwound from the film roll by engagement of the slower moving drive belt with the film. Therefore, sufficient tension is developed in the film between the gate and the film cartridge to depress trigger member 87' by overpowering spring 90' and the spring associated with the snubber. Before trigger member 87' is moved to the position at which it initiates the film-rewinding operation of the projector, the accompanying rotation of snubber arm 88 displaces latching arm 99a to disengage tab 100a from tab 102a, thereby allowing springs 59' and 98a to raise operating lever 95a and lever 57 so that the cam member will return to its initial position by completing a single revolution. Therefore, the illustrated mechanism is restored automatically to the condition depicted in FIG. 1 to allow the projection of the film to proceed. Provision may be made for manually depressing trigger member 87' to enable the operator to discontinue the film stripping and threading operation at any time.

Figure 3:
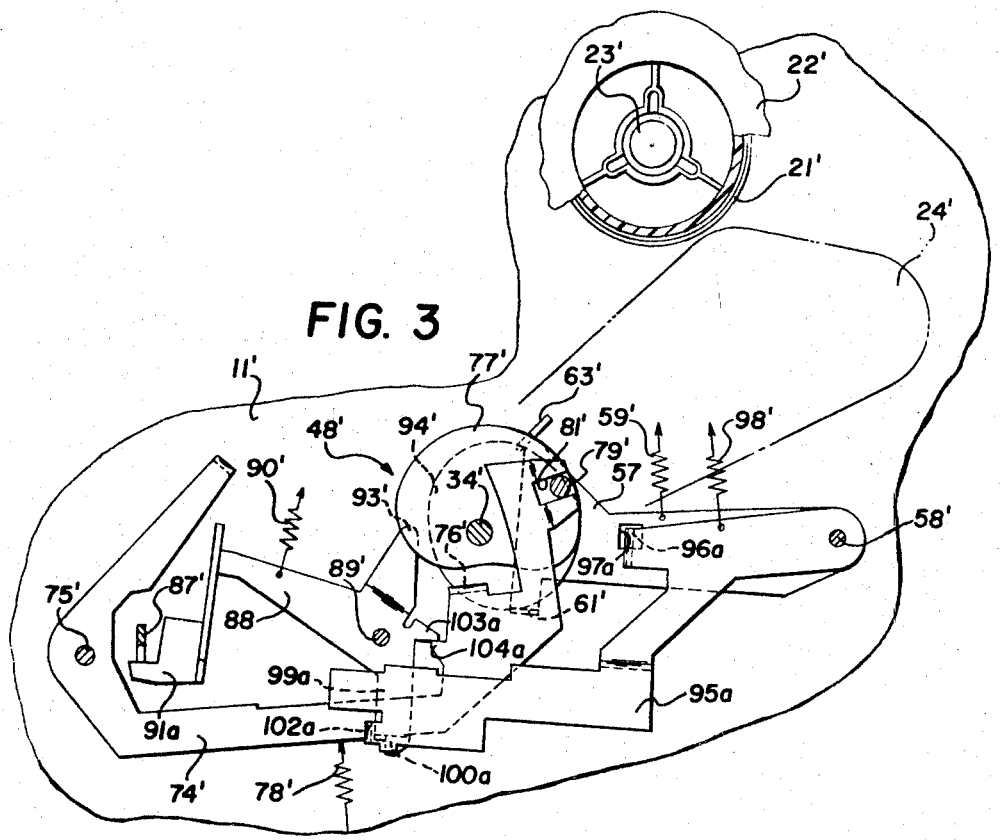
FIG. 3 is a view similar to FIG. 2 and shows the relative positions of the illustrated elements when there is less than a minimum length of film on the supply reel during the film stripping and threading phase of the operating cycle of the projector.
Figure 4:
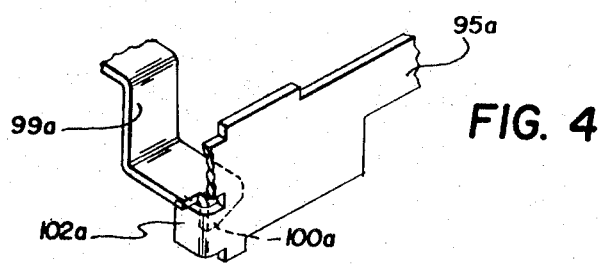
FIG. 4 is a perspective view of the latch member of the control device according to the present invention.

Referring to FIG. 3, I have shown a supply reel upon which less than a minimum length of film has been wound. If such a reel were mounted on the projector, or if there was no reel on the projector, and the film stripping and threading operation initiated, the mechanism might be incapable of withdrawing the leading end of the film from the cartridge. As such, were the latch mechanism to be engaged, it would remain engaged with no film in the guide path to depress trigger member 87'. Although, as mentioned hereinbefore, the operator could manually depress the trigger member to return the mechanism to its initial position shown in FIG. 1, this may cause confusion in cases where the operator is unfamiliar with the projector and has not carefully read the manual. As such, I have provided means to prevent the latch mechanism from becoming engaged in such situations so that the cam member is immediately returned to its initial position as soon as the operator releases operating lever 95a.

In accordance with one feature of the present invention, I have provided aligned teeth 103a and 104a on snubber arm 88 and control lever 74', respectively. When snubber arm 88 has been allowed to move to its position shown in FIG. 2 by rotation of cam lobe 94', tooth 103a lies within the path of tooth 104a on control lever 74' as that lever is moved upwardly by spring 78' as cam lobe 77' presents a decreasing radius to cam follower ear 76'. Normally, when a film reel having a roll of film of greater diameter than the minimum which can be successfully used in a projector is mounted on spindle 23', drive member 24' engages the peripheral surface of the roll to halt further upward movement of tooth 104a. However, should the mechanism be operated in an attempt to withdraw the leading end of a filmstrip from a roll of less than the minimum diameter, as shown in FIG. 3, drive member 24' continues to move toward spindle 23' thereby permitting lever 74' to move counterclockwise until tooth 104a engages tooth 103a. Further movement of the drive member causes tooth 104a to rotate snubber arm 88 against the force of spring 90' to move latch arm 99a to the right as viewed in FIG. 3. This movement causes tab 100a to be withdrawn from the above tab 102a, thereby releasing operating lever 95a and lever 57 so that the cam member will return to its initial position by completing a single revolution.

Thus, by the present invention, the latching mechanism for retaining the film stripping and threading elements in their active positions is disabled when the projector is operated with a supply reel containing less than a minimum length of film thereon or when the projector is operated without a supply reel.

The invention has been described in detail with particular reference to a preferred embodiment thereof, but it will be understood that variations and modifications can be effected within the spirit and scope of the invention.

I claim:

1. In a control device for apparatus having (1) means for supporting a supply roll of web material comprising an elongated strip of web material having a leading end, (2) a stripping and threading mechanism adjustable to an active condition for feeding the leading end of the web material from a supported supply roll of at least a predetermined diameter and to an inactive condition, (3) operating means movable to a first position and to a second position for adjusting the stripping and threading mechanism respectively to its inactive and active conditions, (4) resilient means for biasing said operating means toward said first position, and (5) means for releasably latching said operating means in said second position, the improvement comprising:

detecting means for sensing the movement of said operating means beyond said second position towards said supporting means, thereby detecting the presence on said supporting means of a supply roll having less than said predetermined diameter or the absence on said supporting means of a supply roll; and means responsive to said detecting means for preventing said latching means from latching said operating means in said second position when said detecting means senses the movement of said operating means beyond said second position towards said support means.

2. The improvement defined in claim 1 further comprising means responsive to the feeding of the leading end of the web material from the supply roll for releasing said latching means.

3. The improvement as defined in claim 1 wherein:

said latching means comprises a latching arm movable into engagement with said operating means in response to movement of said operating means from its first position toward said second position to block movement of said operating means to said first position; and said means responsive to said detecting means comprises means for preventing movement of said latching arm into engagement with said operating means when a supply roll of at least said predetermined diameter is not supported on said apparatus.

4. In a control device for a motion picture projector of the type having (1) means for supporting a film supply roll comprising an elongate strip of film having a leading end, (2) a stripping and threading mechanism adjustable to an active condition for feeding the leading end of the film from a supported supply roll of at least a predetermined diameter and to an inactive condition, (3) a rotating drive shaft, (4) a rotatable cam member, (5) clutch-operating means coupled to the shaft and to the cam member and movable between a first position and a second position for effecting rotation of said cam member by said drive shaft to predetermined initial and intermediate rotative locations corresponding respectively to said first and second positions of said clutch-operating means, (6) control means operated by said cam member for adjusting said stripping and threading mechanism to said first condition in response to rotation of said cam member to said initial rotative location and to said second condition in response to rotation of said cam member to said intermediate rotative location, and (7) a latch member movable into operative latching engagement with said clutch-operating means at said second position thereof in response to rotation of said cam member from said initial rotative location toward said intermediate rotative location to releasably retain said clutch-operating means in said second position; the improvement comprising:

detecting means for sensing the presence of a supply roll on said supporting means having less than said predetermined diameter and for sensing the absence on said supporting means of a film supply roll; and means responsive to said detecting means for preventing movement of said latch member into latching engagement with said clutch-operating means when said detecting means senses the presence of a supply roll having less than said predetermined diameter or when said detecting means senses the absence of a supply roll.

5. The improvement defined in claim 4 wherein said means for preventing movement of said latch member comprises means on said control means for blocking such movment of said latch member.

6. In a control device for apparatus having (1) means for supporting a supply roll of web material comprising an elongate strip of web material having a leading end, (2) a web stripping and threading mechanism movable between (*a*) first and second positions wherein the mechanism is ineffective to engage the supply roll to feed web material from the supply roll, and (*b*) each of a plurality of web feeding positions between its first and second positions wherein the mechanism is effective to engage the supply roll and feed the leading end of the web material from a web supply roll which may vary in size from a relatively small diameter roll to a relatively large diameter roll, (3) operating means movable between a first position and a second position for moving the mechanism between its first and second positions, and resilient means for urging said operating means toward its first position, the improvement comprising:

latch means for releasably latching said operating means in at least one position between its first and second positions thereby to latch said stripping and threading mechanism in a web feeding position; and means coupled to said operating means and to said latch means and effective in response to movement of said operating means to its second position for preventing said latch means for latching.

* * * * *